US009495325B2

(12) United States Patent
Gao et al.

(10) Patent No.: US 9,495,325 B2
(45) Date of Patent: *Nov. 15, 2016

(54) REMOTE DIRECT MEMORY ACCESS (RDMA) HIGH PERFORMANCE PRODUCER-CONSUMER MESSAGE PROCESSING

(71) Applicant: International Business Machines Corporation, Armonk, NY (US)

(72) Inventors: Yuqing Gao, Yorktown Heights, NY (US); Xavier R. Guerin, White Plains, NY (US); Xiaoqiao Meng, Yorktown Heights, NY (US); Tiia Salo, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 278 days.

This patent is subject to a terminal disclaimer.

(21) Appl. No.: 14/144,537

(22) Filed: Dec. 30, 2013

(65) Prior Publication Data

US 2015/0186330 A1    Jul. 2, 2015

(51) Int. Cl.
  *G06F 15/167* (2006.01)
  *H04L 12/58* (2006.01)
  *H04L 29/08* (2006.01)

(52) U.S. Cl.
  CPC ............ *G06F 15/167* (2013.01); *H04L 51/04* (2013.01); *H04L 67/02* (2013.01); *H04L 67/1097* (2013.01)

(58) Field of Classification Search
  CPC ...... G06F 15/167; H04L 51/04; H04L 67/02
  See application file for complete search history.

(56) References Cited

U.S. PATENT DOCUMENTS

| 8,577,986 B2 | 11/2013 | Pinkerton et al. | |
| 2005/0018669 A1 | 1/2005 | Arndt et al. | |
| 2006/0136256 A1* | 6/2006 | Roots | G06Q 10/10 705/345 |
| 2006/0230119 A1 | 10/2006 | Hausauer et al. | |
| 2009/0083392 A1* | 3/2009 | Wong | H04L 67/1097 709/212 |
| 2013/0039172 A1 | 2/2013 | Imamura | |
| 2013/0054726 A1 | 2/2013 | Bugge | |
| 2013/0086148 A1 | 4/2013 | Little et al. | |
| 2013/0086199 A1* | 4/2013 | Frank | G06F 9/546 709/213 |

FOREIGN PATENT DOCUMENTS

CN        013116618        5/2013

OTHER PUBLICATIONS

Welsh, Matt., "SEDA: An Architecture for Highly Concurrent Server Applications," Harvard University, May 2006.

* cited by examiner

*Primary Examiner* — Tonia L Dollinger
*Assistant Examiner* — Albert Chiou
(74) *Attorney, Agent, or Firm* — Steven M. Greenberg, Esq.; CRGO Law

(57) ABSTRACT

A method, system and computer program product for remote direct memory access (RDMA) optimized producer-consumer message processing in a messaging hub is provided. The method includes initializing a shared memory region in memory of a host server hosting operation of a messaging hub. The initialization provides for a control portion and one or more data portions, the control portion storing an index to an available one of the data portions. The method also includes transmitting to a message producer an address of the shared memory region and receiving a message in one of the data portions of the shared memory region from the message producer by way of an RDMA write operation on a network interface of the host server. Finally, the method includes retrieving the message from the one of the data portions and processing the message in the messaging hub in response to the receipt of the message.

14 Claims, 2 Drawing Sheets

REMOTE DIRECT MEMORY ACCESS (RDMA) HIGH PERFORMANCE PRODUCER-CONSUMER MESSAGE PROCESSING

BACKGROUND OF THE INVENTION

Field of the Invention

The present invention relates to message processing in a message hub and more particularly to high-speed high volume message processing.

Description of the Related Art

A message hub is middleware disposed within a programmatic infrastructure that supports the exchange of messages between distributed computing systems. In this regard, the message brokering operability of a message hub allows application modules to be distributed over heterogeneous platforms while communicating through message queues managed by a messaging component and reduces the complexity of developing applications that span multiple operating systems and network protocols. As such, the message hub creates a distributed communications layer that insulates the application developer from the details of the various operating system and network interfaces.

Unlike messaging appliances that merely consolidate existing messaging services onto a convenient hardware form factor, the most recent generation of messaging hubs are specifically engineered to deliver massive scale communications beyond the enterprise. These messaging appliances deliver publish and subscribe messaging for machine-to-machine communications, communicatively connecting to a multitude of devices and sensors present with the universe of the Internet. These messaging appliances therefore dramatically scale the number of concurrently connected devices, enabling large volumes of events to be streamed into analytics engines for processing big data.

Of note, most applications utilizing messaging hubs to exchange data, whether between client and server, between processing nodes, processing stages, or threads of execution, require each of low latency—namely one to one hundred microseconds—high throughput—one hundred thousand to ten million messages per second) and also high concurrency—namely multiple persisted messages in flight at once. However the latency costs, when using normal queues in a messaging hub, are in the same order of magnitude as the cost of I/O operations to disk. To the extent that multiple queues are involved in an end-to-end operation, hundreds of microseconds will have been added to the overall latency of the transaction. Further, cache misses at the CPU-level, and locks requiring kernel arbitration also can be the result of traditional queueing in a messaging hug and can be very costly.

The message queue approach within a messaging hub demonstrates additional weakness—namely the potential for a deadlock condition between message producer and message consumer. Specifically, in the message queue approach, the message producer must not attempt to add data into the buffer if the buffer is full. Likewise, the message consumer must not attempt to remove data from an empty buffer. Consequently, in the message queue approach, the message producer either "sleeps" or discards data when the buffer is full. In the mean time, when the message consumer removes data from the buffer, the message consumer notifies the message producer, who in turn can add data into the buffer once again. In the same way, the message consumer can "sleep" when the message consumer finds the buffer to be empty. When the message producer subsequently adds data into the buffer, the message producer wakes the sleeping message consumer. Thus, a deadlock condition can arise where both the message consumer and message producer await awakening by the other.

BRIEF SUMMARY OF THE INVENTION

Embodiments of the present invention address deficiencies of the art in respect to message processing in a messaging hub and provide a novel and non-obvious method, system and computer program product for remote direct memory access (RDMA) optimized producer-consumer message processing in a messaging hub. In an embodiment of the invention, a method for RDMA optimized producer-consumer message processing in a messaging hub includes initializing a shared memory region in memory of a host server hosting operation of a messaging hub.

The initialization provides for a control portion of the shared memory region and one or more data portions of the shared memory region, the control portion storing an index to an available one of the data portions. The method also includes transmitting to a message producer over a computer communications network an address of the shared memory region and receiving a message in one of the data portions of the shared memory region from the message producer by way of an RDMA write operation on a network interface of the host server. Finally, the method includes retrieving the message from the one of the data portions of the shared memory region and processing the received message in the messaging hub in response to the receipt of the message.

In one aspect of the embodiment, the message is retrieved and processed in response to detecting a data available event triggered by the RDMA write operation. In another aspect of the embodiment, the data portions are of equal size and each of the data portions includes a status word indicating whether or not the data portion is in a valid or invalid status indicating whether or not the data has been processed at the server by the messaging hub. As such, in yet another aspect of the embodiment, the message is not written to the next available data portion if the status of the next available data portion is valid and the message is only written to the next available data portion once the status of the next available data portion becomes invalid.

In even yet another aspect of the embodiment, the message is received by way of an RDMA write operation on the network interface by first computing from the address of the shared memory region a location of the control portion, second performing an RDMA fetch-add operation on the location of the control portion to acquire index data from the control portion, third computing a modulo of the index data to result in a location of a next available one of the data portions, and fourth performing an RDMA write operation of the message to the next available one of the data portions.

Finally, the messaging hub processes the message by routing the message to one or more subscribing message consumers. Alternatively, the messaging hub processes the message by discarding the message without routing the message to one or more subscribing message consumers.

In another embodiment of the invention, a data processing system is configured for RDMA optimized producer-consumer message processing in a messaging hub. The system includes a host server with memory and at least one processor and a messaging hub operating in the memory of the host server. The messaging hub provides communicative couplings through a network interface to different message producing applications executing in respectively different client computing systems over a computer communications network. Finally, the system includes an RDMA optimized message processing module executing in the memory of the host server and being coupled to the messaging hub.

The module includes program code enabled during execution to initialize a shared region of the memory of the host server to include a control portion and one or more data portions, the control portion storing an index to an available one of the data portions, to transmit to the message producing applications an address of the shared region of the memory, to receive a message in one of the data portions of the shared region of memory from one of the message producing applications by way of an RDMA write operation on the network interface of the host server, and to retrieving the message from the one of the data portions of the shared memory region and direct processing of the received message in the messaging hub in response to the receipt of the message.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for RDMA optimized producer-consumer message processing in a messaging hub. In accordance with an embodiment of the invention, a messaging hub executing in memory of a server initializes a portion of memory of the server to include a data section and a control section, the control section indexing a free portion of the data section. Thereafter, a remotely disposed message producer seeking to pass a message to the messaging hub can access the control section utilizing RDMA at a network interface of the server and can write data to the free portion specified by the control section also utilizing RDMA at the network interface of the server. The messaging hub in turn can react to the writing of the data to the free portion of memory by reading the data and publishing the data to subscribed message consumers, all without requiring the use of a messaging queue or the intervention of one or more processors of the server to transfer the data from the message producer to the messaging hub.

Figure 1:
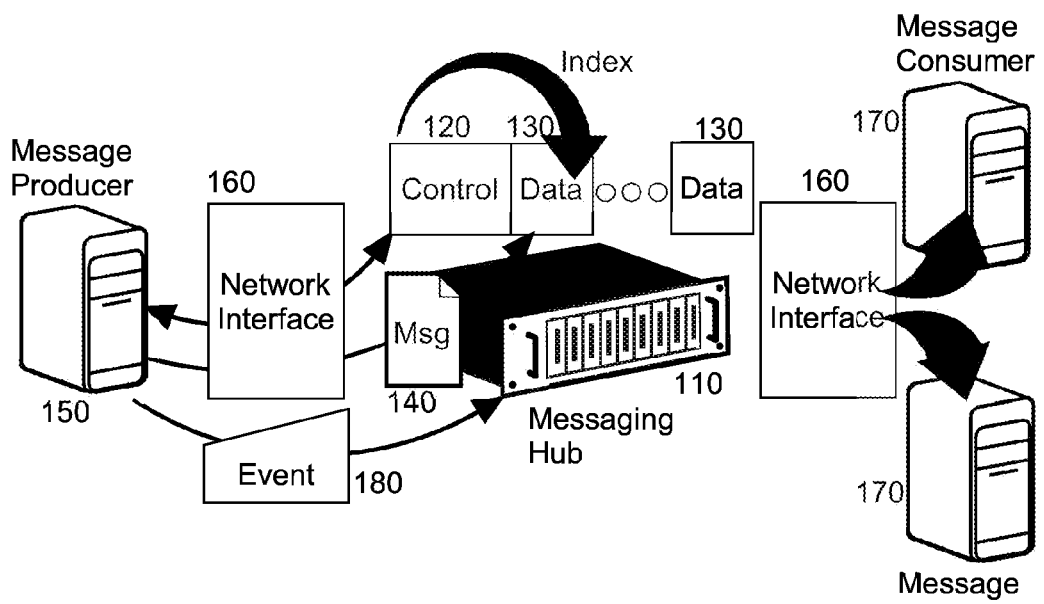
FIG. 1 is a pictorial illustration of a process for RDMA optimized producer-consumer message processing in a messaging hub.

In further illustration, FIG. 1 pictorially shows a process for RDMA optimized producer-consumer message processing in a messaging hub. As shown in FIG. 1, a messaging hub 110 can initialize an area of shared memory to include a control portion 120 and one or more data portions 130. The control portion 120 in particular, can provide an index into an available one of the data portions 130 into which a message can be placed by a message producer 150.

In this regard, a message producer 150 can connect to the messaging hub 110 through a network interface 160 of the messaging hub. Upon connection to the messaging hub 110, the messaging hub 110 can provide an address of the shared memory from which the message producer 150 can deduce the control portion 120. Thereafter, the message producer can acquire an index into the shared memory to a data portion 130 by accessing the content of the control portion 120 utilizing an RDMA request at the network interface 160.

Once the message producer 150 acquires the index, the message producer 150 can write a message 140 to the indexed one of the data portions 130 again utilizing an RDMA operation at the network interface 160. Thereafter, the writing of the message 140 to the indexed one of the data portions 130 can trigger an event 180 in the messaging hub 110 sufficient to alert the messaging hub to read the indexed one of the data portions 130 and to acquire the message 140. Upon acquiring the message 140, the messaging hub 110 can process the message 140, including transmitting the message 140 to different subscribing message consumers 170.

Figure 2:
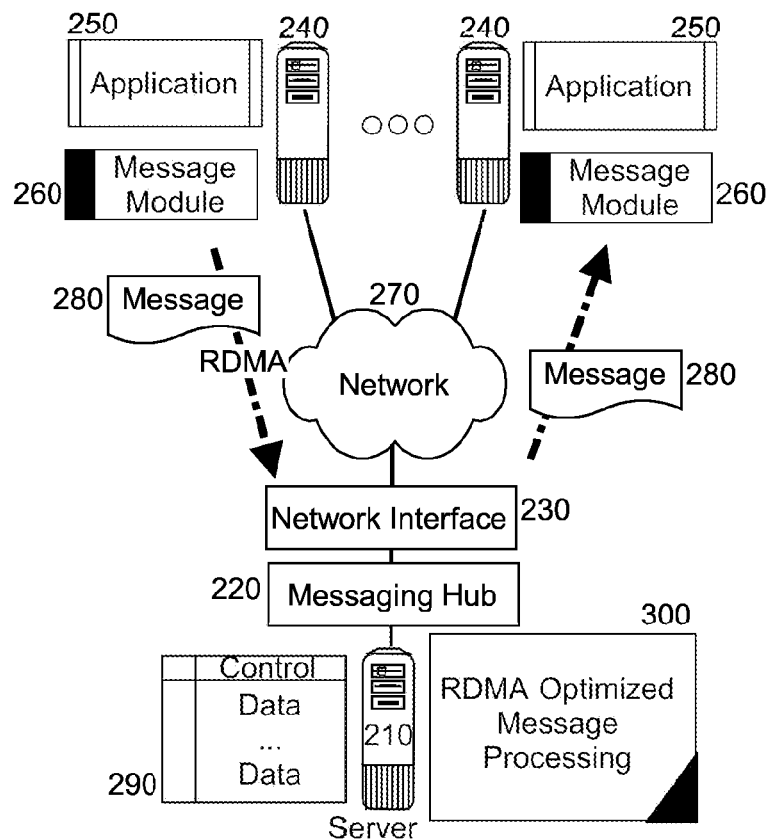
FIG. 2 is a schematic illustration of a data processing system configured for RDMA optimized producer-consumer message processing in a messaging hub; and, FIG. 3 is a flow chart illustrating a process for RDMA optimized producer-consumer message processing in a messaging hub.

The process illustrated in connection with FIG. 1 can be implemented within a data processing system. In more particular illustration, FIG. 2 schematically shows a data processing system configured for RDMA optimized producer-consumer message processing in a messaging hub. The system can include a host server 210 with memory and at least one processor hosting the operation of a messaging hub 220. The messaging hub 220 can be configured to process messages 280 through a network interface 230 of the host server 210 according to a publish and subscribe paradigm from different applications 250 disposed amongst client computing systems 240 over a computer communications network 270.

An RDMA optimized message processing module 300 can execute in the memory of the host server 210 and can interoperate with messaging modules 260 coupled to each of the applications 250 in association with the client computing systems 240. The RDMA optimized message processing module 300 can include program code that when executed in memory of the host server 210, can initialize a region of the memory of the host server 210 for sharing by the different applications 250 exchanging messages 280 with one another. The region can be divided into data portions of equal size and also the region can include a single control portion.

The control portion can store an index of a next free one of the data portions whilst each data portion in addition to storing data in the form of a message 280, can store a status word indicating whether or not the stored data is valid or invalid—valid meaning that the data is ready to be processed by the messaging hub 220 and invalid meaning that the data already has been processed by the messaging hub 220. The program code of the RDMA optimized message processing module 300 also can be enabled during execution in the memory of the host server 210 to respond to a connection by one of the message modules 260 to provide to the message module 260 an address of the shared memory region, the size of each data portion in the shared memory region and a number of total data portions available for utilization by the message modules 260.

Of note, each message module 260 as a cooperative annex to the RDMA optimized message processing module 300, can include program code that when executed in memory of a corresponding one of the client computing systems 240, is enabled to determine from the information provided by the RDMA optimized message processing module 300 during connection a location of the control portion of the shared memory region, for example a location at the beginning of the memory region, and also an address of the first data portion in the shared memory region. Thereafter, the program code of the message module 260 can acquire an index into a first available one of the data portions.

In particular, the program code of the message module 260 first can perform an RDMA fetch-and-add operation of the network interface 230 with respect to the shared memory region location containing the index of the next available one of the data portions. Subsequently the program code of the message module can compute a modulo of the total data portions in the shared memory region to the value returned by the fetch-and-add operation. The result is an index into a first available one of the data sections of the shared region of memory of the host server 210. Optionally, the program code of the message module 260 can determine if the data portion referenced by the index is marked valid or invalid so as to ensure that a message is written to the data section only if the index is marked invalid.

Once the message module 260 has identified a data portion that is known to be in an invalid state, the message module 260 can write the message 280 to the indexed data portion utilizing an RDMA write operation through the network interface 230. As a result, the state of the data portion automatically becomes valid. Also, the RDMA write operation triggers a data available event in the host server 210 that includes an index into the data portion storing the newly written message 280. In response to the data available event, one or more threads of execution of the program code of the RDMA optimized message processing module 300 programmed to react to the data available event can process the message 280 by reading the message 280 into memory, marking the data portion invalid and acting upon the message 280 by transmitting the same to one or more subscribing ones of the applications 250, discarding the message 280, persisting the message 280 or some other operation.

Figure 3:
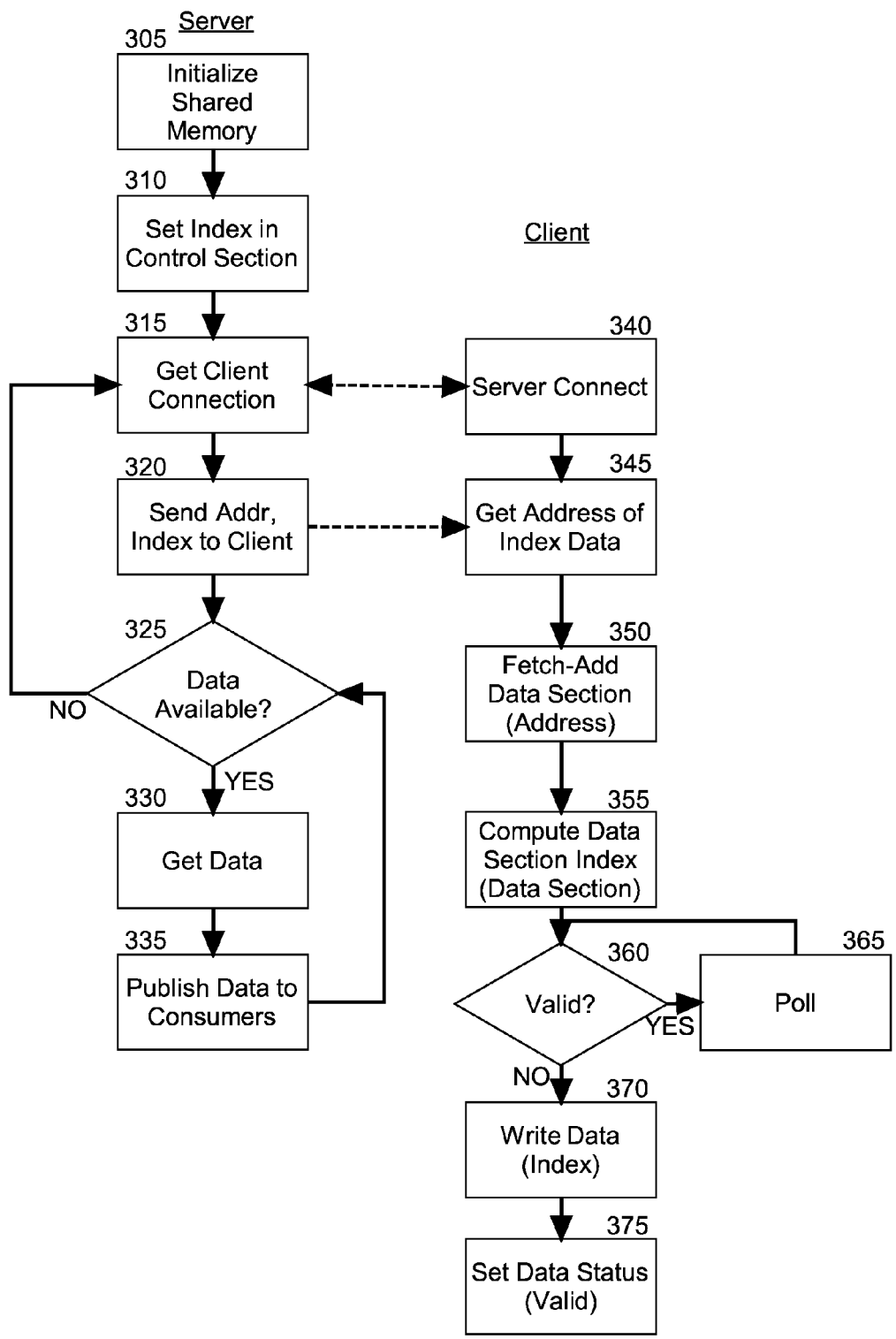

In even more particular illustration of the operation of the RDMA optimized message processing module 300 and the message module 260, FIG. 3 is a flow chart illustrating a process for RDMA optimized producer-consumer message processing in a messaging hub. Beginning in block 305 in reference to the operation of the RDMA optimized message module in the messaging hub, a shared memory region of the host server can be initialized to include both a control portion and one or more data portions of equal size, each data portion also including a word indicating whether or not data is valid or invalid as contained therein. In block 310, an index can be set within the control portion to a first available one of the data portions.

In block 315, a client connection can be received from a message module in a client computing system acting as a message producer. In response, in block 320 the address in memory of the shared memory region along with a number of data portions and a size of each data portion can be provided to the message module. Thereafter, one or more threads of execution of the RDMA optimized message module can await detection of a data available event. In decision block 325, if a data available event is detected, in block 330 a location of the data in one of the data portions of the shared memory region can be determined from the data available event and the data can be retrieved and processed as a message in block 335.

Referring now to the operation of a message module in the message producing client, in block 340 a connection can be established with the host server of the messaging hub so as to produce messages thereto and optionally consume messages therefrom. In block 345, an address in memory of the shared memory region of the host server along with a number of data portions and a size of each data portion can be received from the RDMA optimized message processing module. Thereafter, in block 350 an RDMA fetch-add operation can be invoked on a network interface to the host server hosting the operation of the messaging hub so as to acquire index data from which an index can be computed to a next available data portion of the shared memory region in block 355.

In decision block 360, it can be determined whether or not the next data portion is able to receive newly written data based upon the valid or invalid status of the data portion. If it is determined that the next available data portion is in a valid state, in block 365 the message module can wait while polling the valid or invalid status of the data portion until the status becomes invalid. In decision block 360, if it is determined that the status of the next available data portion is in an invalid state, in block 370 a message can be written to the next available data portion and the status set to valid in block 375. The act of writing the message to the next available data portion in block 370 also will trigger a data available event for handling in blocks 330 and 335.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A data processing system configured for remote direct memory access (RDMA) optimized producer-consumer message processing in a messaging hub, the system comprising:

a host server with memory and at least one processor;

a messaging hub operating in the memory of the host server, the messaging hub providing communicative couplings through a network interface to different message producing applications executing in respectively different client computing systems over a computer communications network; and, an RDMA optimized message processing module executing in the memory of the host server and being coupled to the messaging hub, the module comprising program code enabled during execution to initialize a shared region of the memory of the host server to include a control portion and one or more data portions, the control portion storing an index to an available one of the data portions, to transmit to the message producing applications an address of the shared region of the memory, to receive a message in one of the data portions of the shared region of memory from one of the message producing applications by way of an RDMA write operation on the network interface of the host server, by first computing from the address of the shared memory region a location of the control portion, second performing an RDMA fetch-add operation on the location of the control portion to acquire index data from the control portion, third computing a modulo of the index data to result in a location of a next available one of the data portions, and fourth performing an RDMA write operation of the message to the next available one of the data portions, and to retrieving the message from the one of the data portions of the shared memory region and direct processing of the received message in the messaging hub in response to the receipt of the message.

2. The system of claim 1, wherein the message is retrieved and processed in response to detecting a data available event triggered by the RDMA write operation.

3. The system of claim 1, wherein the data portions are of equal size.

4. The system of claim 1, wherein each of the data portions includes a status word indicating whether or not the data portion is in a valid or invalid status.

5. The system of claim 4, wherein the message is not written to the next available data portion if the status of the next available data portion is valid and wherein the message is only written to the next available data portion once the status of the next available data portion becomes invalid.

6. The system of claim 1, wherein the messaging hub processes the message by routing the message to one or more subscribing message consumers.

7. The system of claim 1, wherein the messaging hub processes the message by discarding the message without routing the message to one or more subscribing message consumers.

8. A computer program product for remote direct memory access (RDMA) optimized producer-consumer message processing in a messaging hub, the computer program product comprising:

a non-transitory computer readable storage medium having computer readable program code embodied therewith, the computer readable program code comprising:

computer readable program code for initializing a shared memory region in memory of a host server hosting operation of a messaging hub, the initialization providing for a control portion of the shared memory region and one or more data portions of the shared memory region, the control portion storing an index to an available one of the data portions;

computer readable program code for transmitting to a message producer over a computer communications network an address of the shared memory region;

computer readable program code for receiving a message in one of the data portions of the shared memory region from the message producer by way of an RDMA write operation on a network interface of the host server, by first computing from the address of the shared memory region a location of the control portion, second performing an RDMA fetch-add operation on the location of the control portion to acquire index data from the control portion, third computing a modulo of the index data to result in a location of a next available one of the data portions, and fourth performing an RDMA write operation of the message to the next available one of the data portions; and, computer readable program code for retrieving the message from the one of the data portions of the shared memory region and processing the received message in the messaging hub in response to the receipt of the message.

9. The computer program product of claim 8, wherein the message is retrieved and processed in response to detecting a data available event triggered by the RDMA write operation.

10. The computer program product of claim 8, wherein the data portions are of equal size.

11. The computer program product of claim 8, wherein each of the data portions includes a status word indicating whether or not the data portion is in a valid or invalid status.

12. The computer program product of claim 11, wherein the message is not written to the next available data portion if the status of the next available data portion is valid and wherein the message is only written to the next available data portion once the status of the next available data portion becomes invalid.

13. The computer program product of claim 8, wherein the messaging hub processes the message by routing the message to one or more subscribing message consumers.

14. The computer program product of claim 8, wherein the messaging hub processes the message by discarding the message without routing the message to one or more subscribing message consumers.

* * * * *